No. 608,691. Patented Aug. 9, 1898.
J. LLOYD.
VEHICLE WHEEL.
(Application filed Nov. 2, 1897.)
(No Model.)
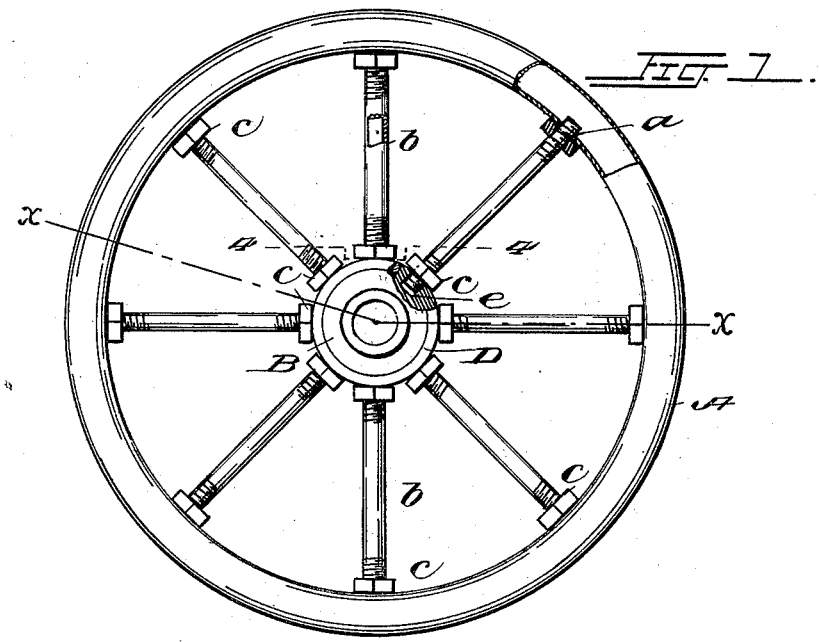
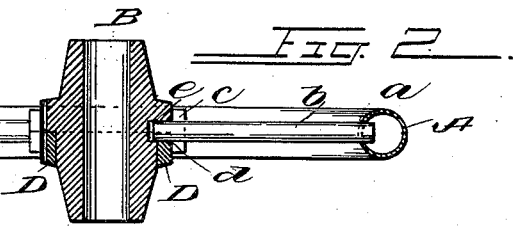
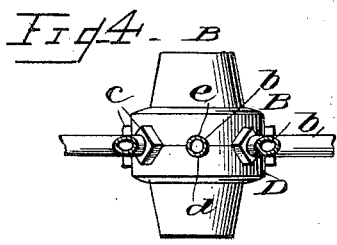
Witnesses
F. H. Muhlenberg
C. H. Muhlenberg
James Lloyd, Inventor
By Attorney

UNITED STATES PATENT OFFICE.

JAMES LLOYD, OF BLANDON, PENNSYLVANIA.

VEHICLE-WHEEL.

SPECIFICATION forming part of Letters Patent No. 608,691, dated August 9, 1898.

Application filed November 2, 1897. Serial No. 657,183. (No model.)

*To all whom it may concern:*

Be it known that I, JAMES LLOYD, a citizen of the United States, residing at Blandon, in the county of Berks and State of Pennsylvania, have invented certain new and useful Improvements in Vehicle-Wheels; and I do hereby declare the following to be a full, clear, and exact description of the invention, such as will enable others skilled in the art to which it appertains to make and use the same.

This invention relates to improvements in wheels for use on vehicles of all kinds.

The object of the invention is to produce a wheel of comparatively cheap construction, one that will stand great wear and will not be affected by dry or wet weather.

The invention is fully described in the following specification and clearly shown in the accompanying drawings.

Figure 1 is a side view of my wheel. Fig. 2 is a cross-section on line $x\ x$ of Fig. 1. Fig. 3 is a modified form of rim. Fig. 4 is a sectional view on the line 4 4, Fig. 1.

The entire wheel, with the exception of the hub, is made of tubing, the hub B being made of aluminium or other suitable material.

The rim A is made of one piece of tubing, preferably round in cross-section, and its meeting ends are brazed or welded to form a smooth joint.

The spokes $b$ are of tubing and are screw-threaded externally at both ends and provided with nuts $c$. The outer ends of these spokes enter screw-threaded openings $a$ in the rim of the wheel and their inner ends enter openings $e$ in the hub B.

A collar D passes over the reduced end of the hub and has a series of semicircular openings $d$, which fit around the inner ends of the spokes, its inner face abutting against the enlarged portion of the hub. The spokes are entered in the openings in the rim until their inner ends will enter the openings in the hub. The collar is then placed in position and the nuts on both ends are tightened up, holding the collar D in position and preventing the spokes from coming out.

There will be no loosening of the spokes in the rim or hub, as is the case with wooden wheels, as dry or wet weather will have no effect whatever upon it.

In Fig. 3 I have shown another form of rim F, in which the tube F' is slightly flattened, and its tread is supplied with a metal tire. In this construction the tire may be removed when worn out and the wheel be re-tired.

Having thus fully described my invention and the manner of making it, what I claim, and desire to secure by Letters Patent, is—

1. A vehicle-wheel comprising a hub having semicircular openings or recesses in its periphery, tubular spokes having their inner ends inserted in said openings, a tubular rim having openings into which the outer ends of said spokes are secured, a collar designed to fit over said hub and close said openings or recesses, and means for securing said collar in position, substantially as set forth.

2. A vehicle-wheel comprising a hub having a peripheral shoulder provided with semicircular openings or recesses, tubular spokes having their ends screw-threaded, the inner ends of said spokes being inserted in said semicircular openings or recesses, a tubular rim have openings into which the outer ends of said spokes are also projected, a collar adapted to fit over said hub and also having semicircular recesses formed therein and designed to coincide with the recesses or openings of said hub, and threaded nuts working on the ends of said spokes, substantially as set forth.

In testimony whereof I affix my signature in presence of two witnesses.

JAMES LLOYD.

Witnesses:
ED. A. KELLY,
LOUIS ALLGAIER.